Oct. 18, 1932.      F. P. BEEDLE ET AL      1,883,489
CULTIVATOR
Filed July 9, 1931      2 Sheets-Sheet 1
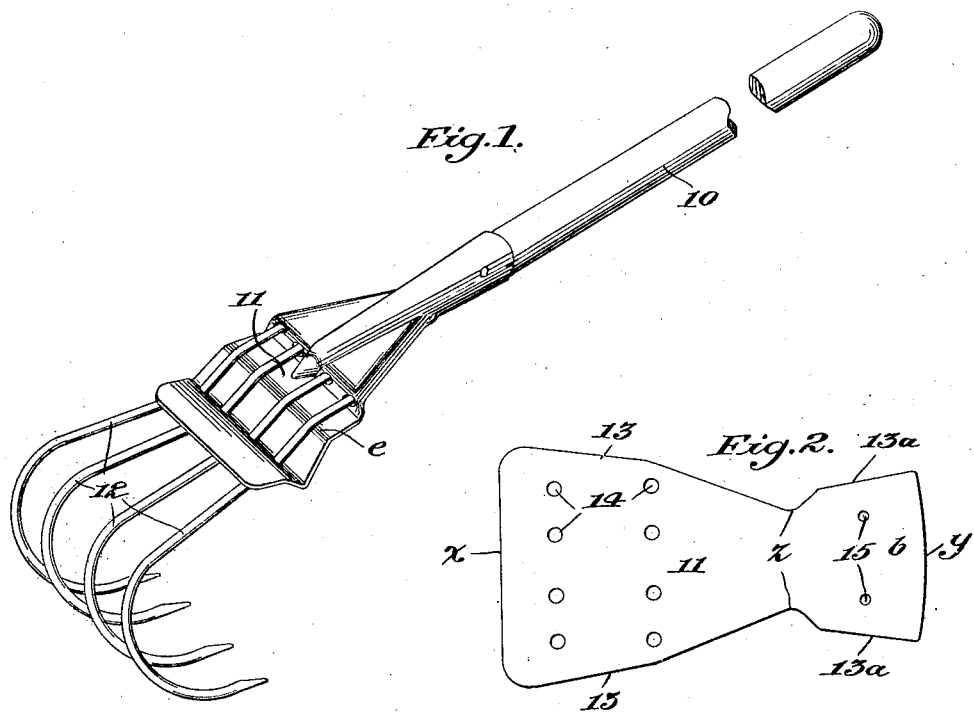
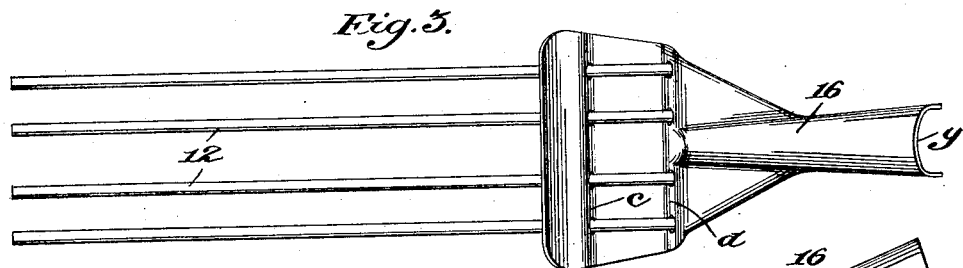
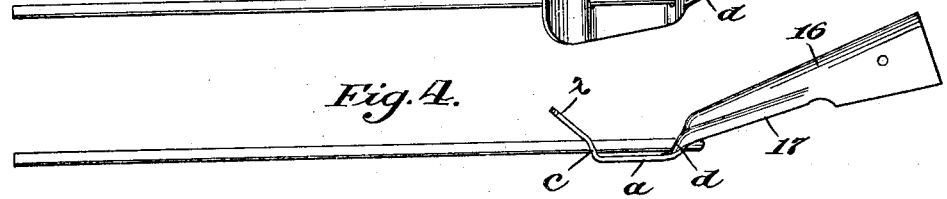
Inventors.
Fred P. Beedle
and Harry T. Kingsbury,
by Sturtevant Mason
Att'ys.

Oct. 18, 1932.  F. P. BEEDLE ET AL  1,883,489
CULTIVATOR
Filed July 9, 1931  2 Sheets-Sheet 2
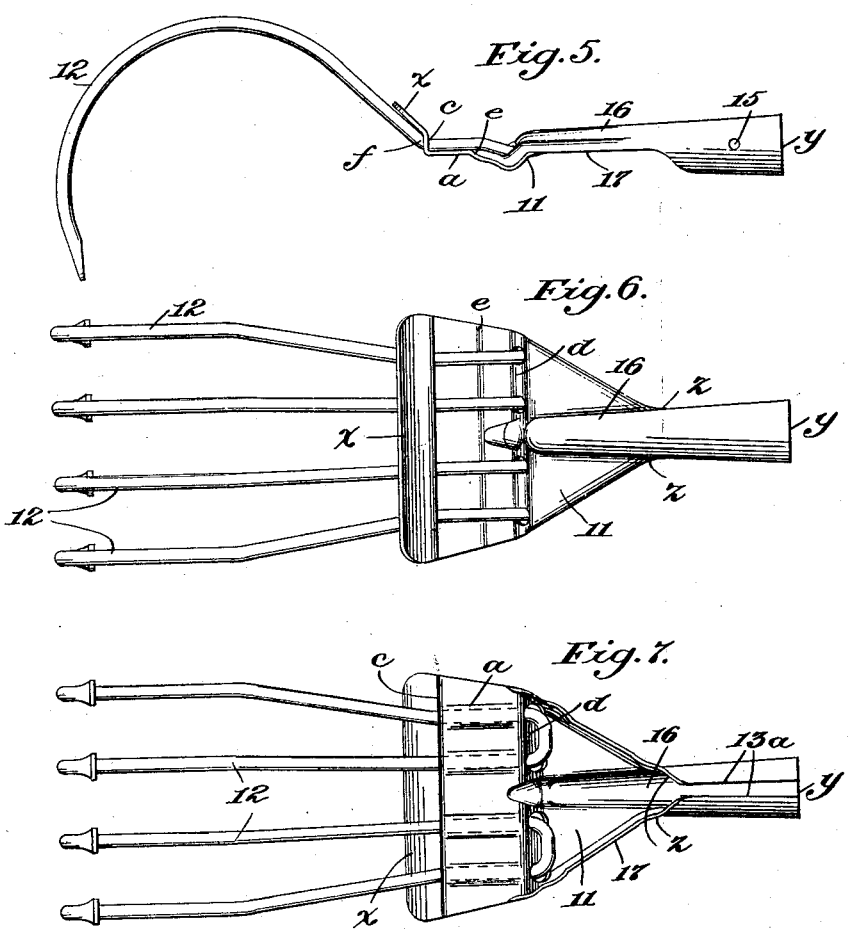

Patented Oct. 18, 1932

1,883,489

UNITED STATES PATENT OFFICE

FRED P. BEEDLE AND HARRY T. KINGSBURY, OF KEENE, NEW HAMPSHIRE

CULTIVATOR

Application filed July 9, 1931. Serial No. 549,778.

The prevent invention relates to improvements in a garden cultivator and weeder of the hand implement type for cultivating the soil around standing plants.

The object of the invention is the provision of a cheaply constructed but extremely durable implement of the above stated character and is particularly concerned with the manner in which the tines are secured in position in the tine head.

With the above and other objects of the invention in view, the invention resides in the sundry details of construction, combination and arrangement of parts hereinafter more fully described and pointed out in the appended claims.

In the drawings, which show the preferred embodiment of the invention, as at present devised, Figure 1 is a perspective view of a cultivating tool of the present invention;

Figure 2 is a plan view of the blank from which the tine holder is formed;

Figure 3 is a plan view of the holder after having been stamped into shape to receive the tines;

Figure 4 is a side view of the structure shown in Figure 3;

Figure 5 is a side view of the holder and tines in completed form;

Figure 6 is a top plan view of the device shown in Figure 5; and

Figure 7 is a bottom view of the device shown in Figure 5.

Referring particularly to the drawings in which like characters refer to similar and like parts throughout the several views, 10 denotes an elongated shank handle having secured to its lower end a tine holder 11 to which are secured a plurality of forwardly extending spring wire tines 12 of a general arcuate shape.

The holder 11 is formed of an elongated strip of metal having its side edges 13 converge from one end $x$ thereof for a major portion of their length toward the other end $y$, but terminating at a point $z$ remote from the end $y$. From the point $z$, the edges 13a of the blank diverge. The major portion $a$ of the blank is provided with at least two rows of transversely spaced openings 14, and the smaller portion of the blank $b$ is provided with spaced openings 15.

The blank is then stamped so as to extend the portions containing the openings 14 upwardly or at substantially right angles with respect to the general plane of the holder, as clearly illustrated at $c$ and $d$ in Figures 3 and 4, in order to bring the openings 14 into alignment. The end portion $x$ of the blank forms an outwardly extending lip projecting at an inclined angle with respect to the portion $c$. Also, at about the same time, the portion of the blank extending from the end $y$ to a point adjacent the portion $d$, is formed with a longitudinally extending tapering channel 16 with the edge portions 13a extending toward each other and cooperating with said channel to form a tapering socket into which the tapering end of the handle shank 10 may be received. In order to give rigidity to this construction, the side edges 13 lying between the portions $d$ and point $z$ are bent at right angles to the body of the holder to form lateral side flanges 17.

With the holder thus formed, substantially U-shaped wire loops are passed through adjacent and aligned openings 14 of each row in the holder, in the manner clearly illustrated in Figures 3 and 4, with the bight of each loop engaging the back surfaces of the angular portion $d$ of the holder. The tines are firmly held in position by flexing the intermediate portion of the blank $a$ lying between the portions $c$ and $d$ and portions of the tine opposing same in the manner clearly shown at $e$ in Figures 1, 5 and 6, and in further bending the tines, as at $f$, to lie in juxtaposition, or substantially so, against the opposing surface of the forwardly extending lip or flange $x$ of the holder. These bends or flexures are permanent, thus the tines are prevented from being withdrawn. The portions of the tines projecting from the holder are bent downwardly in an arcuate or substantially semi-circular shape to form curved spaced spring fingers. The flange $x$ at the outer end of the holder presents a broad backing surface for preventing the tines from flexing or bending to a great extent against the pressure, during use in a manner well understood, which may cause the fingers to break off as a result of undue strain and flexing at the angle $f$.

From the foregoing, it will be observed that a very durable and cheaply constructed cultivator has been provided for weeding or cultivating close to shrubbery without damage to the same; and that the tines are held in the holder in such a manner as to be permanently secured without providing abrupt bends in the tines which may eventually cause them to weaken at these points and break off.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may be embodied within the scope thereof.

What is claimed is:

1. A cultivator implement including tines and a holder therefor, a handle on said holder, the body portion of said holder including a relatively flat member having laterally extending flange portions each having a row of openings therein aligned with the openings in the other flange portion, a plurality of U-shaped tines having their legs extended through said openings with the bight end of each tine engaging one of said perforated flange portions; the portion of said holder between said flange portions together with the opposing portions of said tines being bent transversely of the tines and out of a straight line, whereby the tines are held in position.

2. A cultivator implement including tines and a holder therefor, a handle on said holder, the body portion of said holder including a relatively flat member having laterally extending flange portions each having a row of openings therein aligned with the openings in the other flange portion, a plurality of U-shaped tines having their legs extended through said openings with the bight end of each tine engaging one of said perforated flange portions; the portion of said holder between said flange portions together with the opposing portions of said tines being bent transversely of the tines and out of a straight line, and said tines extending angularly with respect to their bight end portions from the point said tines project from the other perforated flange portion of said holder.

3. A cultivator implement including tines and a holder therefor, a handle on said holder, the body portion of said holder including a relatively flat member having laterally extending flange portions each having a row of openings therein aligned with the openings in the other flange portion, a plurality of U-shaped tines having their legs extended through said openings with the bight end of each tine engaging one of said perforated flange portions; the portion of said holder between said flange portions together with the opposing portions of said tines being bent transversely of the tines and out of a straight line, said tines extending angularly with respect to their bight end portions from the point said tines project from the other perforated flange portion of said holder, and a flange provided on the forward end of said holder and overlying and engageable by said tines to prevent undue flexing of the tines.

4. A cultivator implement including tines and a holder therefor, a handle on said holder, the body portion of said holder including a relatively flat member having laterally extending flange portions each having a row of openings therein aligned with the openings in the other flange portion, a plurality of U-shaped tines having their legs extended through said openings with the bight end of each tine engaging one of said perforated flange portions; said tines extending angularly with respect to their bight end portions from the point said tines project from the other flange portion of said holder, the rear end portion of the holder having its side edges formed into a socket for receiving the end of said handle and for reinforcing said holder.

5. A cultivator implement including tines and a holder therefor, a handle on said holder, the body portion of said holder having laterally extending flange portions provided with axially aligned openings, the tines extending through the alined openings of each row and having curved end portions projecting beyond said holder, one of said flanges having a portion projecting outwardly at an upward inclination and overlying said tines to provide a bearing surface therefor, the rear end portion of the holder having its side edges formed into a socket for receiving the end of said handle and for reinforcing said holder.

In testimony whereof, we affix our signature.

FRED P. BEEDLE.
HARRY T. KINGSBURY.